United States Patent
Hong

(10) Patent No.: US 9,467,977 B2
(45) Date of Patent: Oct. 11, 2016

(54) APPARATUS AND METHOD FOR ALLOCATING RESOURCE IN COMMUNICATION SYSTEM

(71) Applicant: ELECTRONICS AND TELECOMMUNICATIONS RESEARCH INSTITUTE, Daejeon (KR)

(72) Inventor: Tae-Chul Hong, Seoul (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 546 days.

(21) Appl. No.: 13/681,589

(22) Filed: Nov. 20, 2012

(65) Prior Publication Data

US 2013/0244571 A1    Sep. 19, 2013

(30) Foreign Application Priority Data

Mar. 19, 2012 (KR) .................. 10-2012-0027832

(51) Int. Cl.
  *H04B 7/185* (2006.01)
  *H04W 72/04* (2009.01)

(52) U.S. Cl.
  CPC .......... *H04W 72/04* (2013.01); *H04B 7/1851* (2013.01); *H04B 7/18586* (2013.01)

(58) Field of Classification Search
  CPC  H04B 7/1851; H04B 7/18586; H04W 72/04
  USPC ......................... 455/12.1, 98, 427
  See application file for complete search history.

(56) References Cited

U.S. PATENT DOCUMENTS

2004/0072570 A1* 4/2004 Smith .................... 455/446
2007/0178930 A1  8/2007 Xiao et al.
(Continued)

FOREIGN PATENT DOCUMENTS

KR   1020070076533 A   7/2007
KR   1020080041237 A   5/2008
(Continued)

OTHER PUBLICATIONS

"Detailed Specifications of the Radio Interfaces for the Satellite Component of International Mobile Telecommunications-Advanced (IMT-Advanced): Satellite Radio Interface SAT-OFDM", International Telecommunication Union, Radiocommunication Study Groups, Document 4B/16-E, May 16, 2012.

*Primary Examiner* — Ping Hsieh
*Assistant Examiner* — Xin Jia
(74) *Attorney, Agent, or Firm* — Ladas & Parry LLP

(57) ABSTRACT

An apparatus for allocating resources in a communication system includes a reception unit configured to receive information on a terminal from the terminal when the terminal initially accesses the apparatus in order to receive communication service, a determination unit configured to check information on a bandwidth for providing the communication service to the terminal, the information on the terminal, and information on a satellite and determine the size of a resource block group to be allocated to the terminal by taking the information on the bandwidth, the information on the terminal, and information on the satellite into consideration, and an allocation unit configured to allocate resource blocks corresponding to the size of the resource block group to the terminal in order to transmit and receive data packets to and from the terminal.

10 Claims, 2 Drawing Sheets

(56) References Cited

U.S. PATENT DOCUMENTS

| | | | |
|---|---|---|---|
| 2008/0080378 A1* | 4/2008 | Kim et al. | 370/234 |
| 2008/0220793 A1 | 9/2008 | So et al. | |
| 2008/0228654 A1* | 9/2008 | Edge | 705/71 |
| 2010/0068993 A1 | 3/2010 | Khan | |
| 2010/0118769 A1* | 5/2010 | Agarwal | 370/321 |
| 2011/0110322 A1* | 5/2011 | Koyanagi | H04L 5/0041 370/329 |
| 2011/0228712 A1 | 9/2011 | Anderson | |

FOREIGN PATENT DOCUMENTS

| | | |
|---|---|---|
| KR | 1020080081589 A | 9/2008 |
| KR | 1020100091326 A | 8/2010 |

* cited by examiner

APPARATUS AND METHOD FOR ALLOCATING RESOURCE IN COMMUNICATION SYSTEM

CROSS-REFERENCE TO RELATED APPLICATIONS

The present application claims priority of Korean Patent Application No. 10-2012-0027832, filed on Mar. 19, 2012, which is incorporated herein by reference in its entirety.

BACKGROUND OF THE INVENTION

1. Field of the Invention

Exemplary embodiments of the present invention relate to a communication system and, more particularly, to an apparatus and method for allocating resources which adaptively provide communication service to a terminal capable of performing satellite communication and terrestrial communication in a communication system.

2. Description of Related Art

In a current communication system, there has been active research carried out in order to provide users with a variety of Quality of Services (QoSs) having a high-speed transfer rate. In a terrestrial communication system, that is, an example of the communication system, there has been active research carried out on schemes for transmitting a large amount of data through limited resources at a high speed and stably. Furthermore, even in a satellite communication system, that is, an example of another communication system, there has been active research carried out on schemes for transmitting a large amount of data through limited resources at a high speed and stably.

Meanwhile, in a recent satellite communication system, there has been active research carried out on schemes for providing a terminal with communication service like in a terrestrial communication system. In particular, there has been active research carried out in order for a satellite communication system and a terrestrial communication system to provide a terminal with communication service by transmitting and receiving data packets to and from the terminal.

In a current communication system, however, a detailed method in which a satellite communication system and a terrestrial communication system transmit and receive data packets to and from a terminal, that is, a detailed method in which a satellite communication system and a terrestrial communication system allocate resources to a terminal in order to transmit and receive data packets to and from the terminal, has not yet been proposed. In particular, a detailed method in which a satellite communication system allocates resources to a terminal configured to transmit and receive data packets to and from a terrestrial communication system so that the terminal can transmit and receive data packets to and from the satellite communication system like a terrestrial communication system has not yet been proposed.

Accordingly, there is a need for a method in which communication systems, for example, a satellite communication system and a terrestrial communication system allocate resources to a terminal in order to transmit and receive data packets to and from the terminal. In particular, there is a need for a method of allocating resources, in which the satellite communication system allocates resources to a terminal configured to transmit and receive data packets to and from the terrestrial communication system so that the terminal can transmit and receive data packets to and from the satellite communication system.

SUMMARY OF THE INVENTION

An embodiment of the present invention is directed to an apparatus and method for allocating resources in a communication system.

Another embodiment of the present invention is directed to an apparatus and method for allocating resources, which transmit and receive a large amount of data packets to a terminal through limited resources in a communication system.

Another embodiment of the present invention is directed to an apparatus and method for allocating resources, in which a satellite communication system allocates resources to a terminal configured to transmit and receive data packets to and from a terrestrial communication system so that the terminal can transmit and receive data packets to and from the satellite communication system.

Another embodiment of the present invention is directed to an apparatus and method for allocating resources to a terminal adaptively to satellite communication and terrestrial communication in order to stably transmit and receive a large amount of data packets to and from the terminal configured to transmit and receive data packets through the satellite communication and the terrestrial communication in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for allocating resources in a communication system includes a reception unit configured to receive information on a terminal from the terminal when the terminal initially accesses the apparatus in order to receive communication service, a determination unit configured to check information on a bandwidth for providing the communication service to the terminal, the information on the terminal, and information on a satellite and determine the size of a resource block group to be allocated to the terminal by taking the information on the bandwidth, the information on the terminal, and information on the satellite into consideration, and an allocation unit configured to allocate resource blocks corresponding to the size of the resource block group to the terminal in order to transmit and receive data packets to and from the terminal.

In accordance with another embodiment of the present invention, a method of allocating resources in a communication system includes receiving information on a terminal from the terminal when the terminal is initially connected in order to receive communication service, checking information on a bandwidth for providing the communication service to the terminal, the information on the terminal, and information on a satellite and determining a size of a resource block group allocated to the terminal by taking the information on the bandwidth, the information on the terminal, and information on the satellite into consideration, and allocating resource blocks corresponding to the size of the resource block group to the terminal in order to transmit and receive data packets to and from the terminal.

DESCRIPTION OF SPECIFIC EMBODIMENTS

Figure 1:
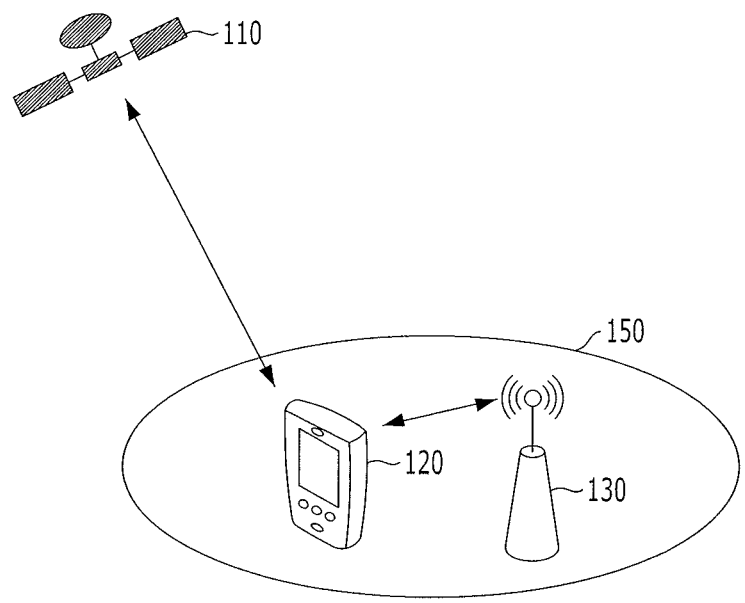
FIG. 1 is a schematic diagram showing the structure of a communication system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention proposes an apparatus and method for allocating resources in a communication system, for example, a satellite communication system and a terrestrial communication system. In an embodiment of the present invention, a resource allocation method for transmitting and receiving a large amount of data packets in a satellite communication system and a terrestrial communication system is described as an example, but the resource allocation method proposed by the present invention can also be applied to other communication systems.

Furthermore, an embodiment of the present invention proposes an apparatus and method for allocating a frequency band to a terminal configured to transmit and receive data packets through limited resources, for example, frequency resources in order to provide communication service having a variety of QoSs to the terminal in a communication system. In an embodiment of the present invention, communication systems, that is, a satellite communication system and a terrestrial communication system, allocate resources to a terminal in order to transmit and receive a large amount of data to and from the terminal through satellite communication and terrestrial communication, and the terminal transmits and receives a large amount of data adaptively to the satellite communication and the terrestrial communication through the allocated resources.

Furthermore, in an embodiment of the present invention, a satellite communication system provides communication service to a terminal configured to receive communication service from a terrestrial communication system by adaptively allocating resources to the terminal like the terrestrial communication system in a communication system. That is, in an embodiment of the present invention, a satellite communication system adaptively allocates resources to a terrestrial communication system for a terminal capable of transmitting and receiving data packets through satellite communication and terrestrial communication and transmits and receives data packets to and from the terminal through the satellite communication using the allocated resources. The structure of a communication system in accordance with an embodiment of the present invention is described in detail below.

FIG. 1 is a schematic diagram showing the structure of a communication system in accordance with an embodiment of the present invention.

Referring to FIG. 1, the communication system includes a terminal 120 configured to receive communication service through satellite communication and terrestrial communication within a specific service area 150 as described above, the satellite 110 of a satellite communication system configured to provide communication service to the terminal 120 through the satellite communication, and a base station 130 configured to provide communication service to the terminal 120 through the terrestrial communication.

The terminal 120 transmits and receives data packets to and from the base station 130 through the terrestrial communication, that is, receives communication service from a terrestrial communication system within the specific service area 150. Furthermore, the terminal 120 transmits and receives data packets to and from the satellite 110 through satellite communication, that is, receives communication service from the satellite communication system, like in the terrestrial communication with the base station 130.

The base station 130 allocates resources for transmitting and receiving data packets to the terminal 120 in order to transmit and receive the data packets to and from the terminal 120 through terrestrial communication as described above. In particular, the base station 130 allocates resources to the downlink and uplink of the terminal 120. The base station 130 allocates resources to the terminal 120 using information on resources necessary for the terminal 120 to transmit and receive data packets, for example, information on a bandwidth available for transmitting and receiving data packets, information on a base station, information on a terminal, for example, information on the communication method of the terminal, information on the power of the terminal, and information on the antenna gain of the terminal.

Here, the base station 130 determines the number of resource blocks, corresponding to a resource block group that is allocated to the terminal 120 at once in a bandwidth available for the terminal 120, and allocates resources to the terminal 120 or allocates a maximum number of resource blocks in a bandwidth available for the terminal 120 to the terminal 120. The resource allocation of the base station 130, that is, the allocation of resources in a terrestrial communication system, will be described in detail with reference to FIG. 2, and thus a detailed description thereof is omitted.

Furthermore, the satellite 110 allocates resources for transmitting and receiving data packets to the terminal 120 in order to transmit and receive the data packets to an from the terminal 120 through satellite communication as described above. In particular, the satellite 110 allocates resources to the downlink and uplink of the terminal 120. The satellite 110 allocates resources to the terminal 120 using information on resources necessary for the terminal 120 to transmit and receive data packets, for example, information on a bandwidth available for transmitting and receiving data packets, information on the satellite, for example, information on the power of the satellite and information on the antenna gain of the satellite, and information on the terminal, for example, information on the communication method of the terminal, information on the power of the terminal, and information on the antenna gain of the terminal.

The satellite 110 determines the number of resource blocks, corresponding to a resource block group that can be allocated to the terminal 120 at once in a bandwidth available for the terminal 120, and allocates the number of determined resource blocks to the terminal 120. The allocation of resources in communication systems, that is, a terrestrial communication system and a satellite communication system, in accordance with an embodiment of the present invention is described in more detail below with reference to FIG. 2.

Figure 2:
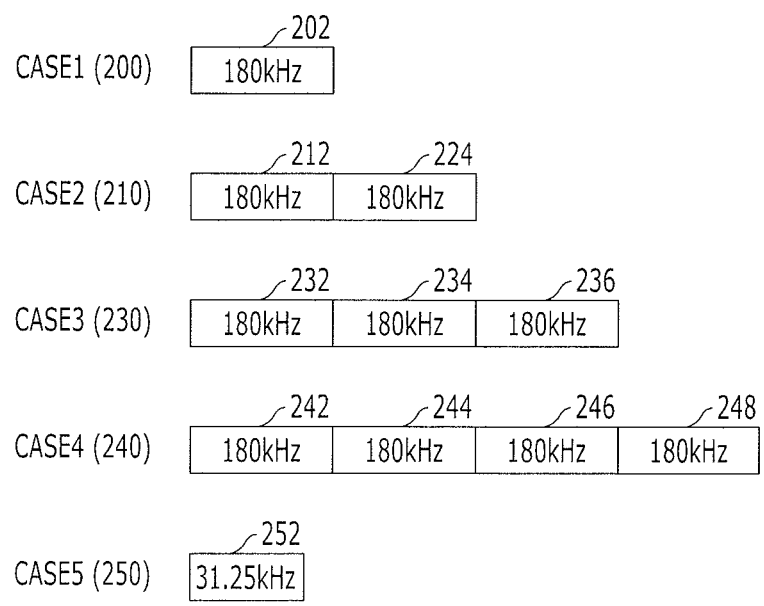
FIG. 2 is a diagram illustrating the allocation of resources in communication systems in accordance with an embodiment of the present invention.

FIG. 2 is a diagram illustrating the allocation of resources in communication systems in accordance with an embodiment of the present invention. FIG. 2 is a schematic diagram showing the structure of allocated resource blocks in a terrestrial communication system and a satellite communication system.

Referring to FIG. 2, first, the terrestrial communication system determines the size of a resource block group for the downlink and uplink of the terminal 120 using information on resources, that is, information on a bandwidth, information on the base station 130, and information on the terminal 120 and allocates resource blocks corresponding to the determined size of the resource block group. More particularly, the terrestrial communication system checks a bandwidth available for transmitting and receiving data packets to and from the terminal 120 based on the information on the bandwidth, determines the size of a resource block group with consideration taken of information on the base station 130, for example, information on the transmission power of the base station and information on the antenna gain of the base station, information on the terminal 120, for example, information on the type of terminal, information on the transmission power of the terminal, and information on the antenna gain of the terminal in the available bandwidth, and allocates resource blocks corresponding to the determined size of the resource block group to the terminal 120. Here, the terrestrial communication system is informed of the information on the terminal when the terminal 120 transmits the information on the terminal to the terrestrial communication system, that is, the base station 130 at the time of initial access or communication with the terminal. The information on the type of terminal is determined by a method of using the terminal, a communication method of the terminal, and the type of communication service to be received by the terminal.

Furthermore, the terrestrial communication system determines a specific number of resource blocks, each having 180 kHz, as the size of a resource block group used to transmit and receive data packets to and from the terminal 120 according to the available bandwidth and allocates the number of resource blocks, corresponding to the determined size of the resource block group, to the terminal. For example, if the number of resource blocks of the available bandwidth is 10 or less according to the available bandwidth checked based on the information on the bandwidth, the terrestrial communication system determines one unit resource block 202 of 180 kHz as the size of the resource block group (CASE1 (200)). Furthermore, if the number of resource blocks of the available bandwidth is 26 or less according to the available bandwidth checked based on the information on the bandwidth, the terrestrial communication system determines two resource blocks 212 and 224 each having 180 kHz as the size of the resource block group (CASE2 (210)). If the number of resource blocks of the available bandwidth is 63 or less according to the available bandwidth checked based on the information on the bandwidth, the terrestrial communication system determines three resource blocks 232, 234, and 236 each having 180 kHz as the size of the resource block group (CASE3 (230)). If the number of resource blocks of the available bandwidth exceeds 63, the terrestrial communication system determines four resource blocks 242, 244, 246, and 248 each having 180 kHz as the size of the resource block group (CASE4 (240)).

Furthermore, the satellite communication system determines the size of a resource block group for the downlink and uplink of the terminal 120 based on information on resources, that is, information on a bandwidth, information on the satellite 110, that is, information on the base station 130, and information on the terminal 120 and allocates resource blocks based on the determined size of the resource block group. More particularly, the satellite communication system checks a bandwidth available for transmitting and receiving data packets to and from the terminal 120 based on the information on the bandwidth, determines the size of a resource block group with consideration taken of information on the satellite 110, for example, information on the transmission power of the satellite and information on the antenna gain of the satellite, information on the terminal 120, for example, information on the type of terminal, information on the transmission power of the terminal, and information on the antenna gain of the terminal in the available bandwidth, and allocating resource blocks based on the determined size of the resource block group. Here, the satellite communication system is informed of the information on the terminal when the terminal 120 transmits the information on the terminal to the satellite communication system, that is, the satellite 110, when initial access for communication with the terminal is performed. The information on the type of terminal is determined by a method of using the terminal, a communication method of the terminal, and the type of communication service to be received by the terminal.

Furthermore, the satellite communication system classifies terminals into classes. For example, the satellite communication system classifies the terminals into Class A in which the maximum size of a resource block group is 1, Class B in which the maximum size of a resource block group is 2, Class C in which the maximum size of a resource block group is 3, and Class D in which the maximum size of a resource block group is 4 by taking the information on the satellite and the information on the terminal into consideration. Here, the terminals are classified based on the information on the satellite, that is, the information on the transmission power of the satellite and the information on the antenna gain of the satellite, and the information on the terminal, that is, the information on the type of terminal, the information on the transmission power of the terminal, and the information on the antenna gain of the terminal.

Furthermore, the satellite communication system determines the size of a resource block group that is allocated at once, compares the size of a resource block group determined based on the available bandwidth with the maximum size of a resource block group according to the classification of the terminal, and determines the size of a resource block group corresponding to resource blocks to be allocated to the terminal, for example, the size of a resource block group having a smaller size based on a result of the comparison as the final size of a resource block group. That is, the satellite communication system compares the size of a resource block group, determined according to an available bandwidth checked based on the information on the bandwidth, with the maximum size of a resource block group determined according to the class of the terminal based on the information on the satellite and the information on the terminal, determines the size of a resource block group based on a result of the comparison, and allocates a specific number of resource blocks each having 180 kHz, corresponding to the determined size of the resource block group in the available bandwidth, in order to transmit and receive data packets to and from the terminal based on the determined size of the resource block group.

For example, if the number of resource blocks of the available bandwidth is 10 or less, the satellite communication system determines the unit resource block 202 of 180 kHz as the size of a resource block group (CASE1 (200)). Furthermore, if the number of resource blocks of the maximum available bandwidth is 26 or less, the satellite communication system determines the unit resource block 202 of 180 kHz as the size of a resource block group for a terminal of Class A (CASE1 (200)) and determines the two resource blocks 212 and 224 each having 180 kHz as the size of the resource block group for terminals of Class B, Class C, and Class D (CASE2 (210)).

Furthermore, if the number of resource blocks of the available bandwidth is 63 or less, the satellite communication system determines the unit resource block 202 of 180 kHz as the size of a resource block group for a terminal of Class A (CASE1 200)), determines the two resource blocks 212 and 224 each having 180 kHz as the size of a resource block group for a terminal of Class B (CASE2 210)), and determines the three resource blocks 232, 234, and 236 each having 180 kHz as the size of a resource block group for terminals of Class C and Class D (CASE3 230). Furthermore, if the number of resource blocks of the available bandwidth exceeds 63, the satellite communication system determines the unit resource block 202 of 180 kHz as the size of a resource block group for a terminal of Class A (CASE1 200)), determines the two resource blocks 212 and 224 each having 180 kHz as the size of a resource block group for a terminal of Class B (CASE2 210)), determines the three resource blocks 232, 234, and 236 each having 180 kHz as the size of a resource block group for a terminal of Class C (CASE3 230), and determines the fourth resource blocks 242, 244, 246, and 248 each having 180 kHz as the size of a resource block group for a terminal of Class D (CASE4 (240)).

As described above, communication systems in accordance with an embodiment of the present invention, that is, a terrestrial communication system and a satellite communication system check a bandwidth available for transmitting and receiving data packets to and from a terminal based on information on a bandwidth, determine the size of a resource block group allocated to the terminal by taking information on the terminal and information on a base station or information on a satellite into consideration in the available bandwidth, in particular, determine the number of resource blocks by taking the transmission power and antenna gain of the terminal and the transmission power and antenna gain of the satellite or base station into consideration, and allocate resource blocks corresponding to the determined size of the resource block group to the terminal.

An apparatus for allocating resources in a communication system in accordance with an embodiment of the present invention is described in more detail below with reference to FIG. 3.

Figure 3:
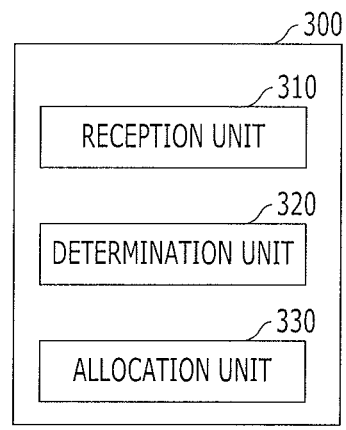
FIG. 3 is a schematic diagram showing the construction of an apparatus for allocating resources in communication systems in accordance with an embodiment of the present invention.

FIG. 3 is a schematic diagram showing the construction of the apparatus for allocating resources in communication systems in accordance with an embodiment of the present invention. FIG. 3 is a schematic diagram showing the construction of a scheduler, that is, an apparatus for allocating resources in a satellite communication system and a terrestrial communication system. Furthermore, the scheduler can be included in the satellite 110 or the base station 130 or may be included at the top of the satellite 110 or the base station 130. It is assumed that the scheduler is included in the satellite or the base station, for convenience of description.

Referring to FIG. 3, the scheduler 300 includes a reception unit 310 configured to receive information on the terminal 120 from the terminal when the terminal initially accesses the scheduler in order to receive communication service, a determination unit 320 configured to check the received information on the terminal, information on a bandwidth, and information on the satellite 10 (or information on the base station 130) and determine the size of a resource block group to be allocated to the terminal based on the checked information, and an allocation unit 330 configured to allocate resource blocks corresponding to the determined size of the resource block group to the terminal.

The reception unit 310 receives information on the terminal 120 from the terminal when the terminal initially accesses the scheduler as described above. The information on the terminal includes information on the type of terminal, information on transmission power necessary for the terminal to transmit and receive data packets, and information on the antenna gain of the terminal that is necessary to transmit and receive data packets. Here, the information on the type of terminal includes information on a method of using the terminal, information on a communication method of the terminal, and information on the type of communication service to be received by the terminal. Furthermore, the information on the transmission power includes information on a maximum available transmission power level when the terminal transmits data packets in an available bandwidth checked based on the information on the bandwidth.

The determination unit 320 checks a bandwidth available for transmitting and receiving data packets to and from the terminal based on the information on the bandwidth and determines the size of a resource block group to be allocated to the terminal in the available bandwidth by taking the information on the terminal and the information on the satellite (or the information on the base station) into consideration. That is, the determination unit 320 determines the size of a resource block group in the available bandwidth based on information on the transmission power of the terminal, information on the antenna gain of the terminal, information on the type of terminal, information on the transmission power of the satellite (or the base station), and information on the antenna gain of the satellite (or the base station).

Here, the determination unit 320 classifies the terminals into classes by taking the information on the transmission power of the terminal, the information on the antenna gain of the terminal, and the information on the type of terminal into consideration and determines the maximum size of a resource block group in the available bandwidth so that a specific number of resource blocks or less are allocated according to the class of the terminal. Furthermore, the determination unit 320 compares the size of the resource block group, determined based on the available bandwidth, with the maximum size of the resource block group and determines the size of a resource block group to be allocated to the terminal based on a result of the comparison. The allocation unit 330 allocates resource blocks corresponding to the determined size of the resource block group to the terminal. Here, the determination of the size of the resource block group, that is, the allocation of resource blocks in the available bandwidth, has been described in detail with reference to FIG. 2, and thus a detailed description thereof is omitted. An operation of allocating resources in a communication system in accordance with an embodiment of the present invention is described in more detail below with reference to FIG. 4.

Figure 4:
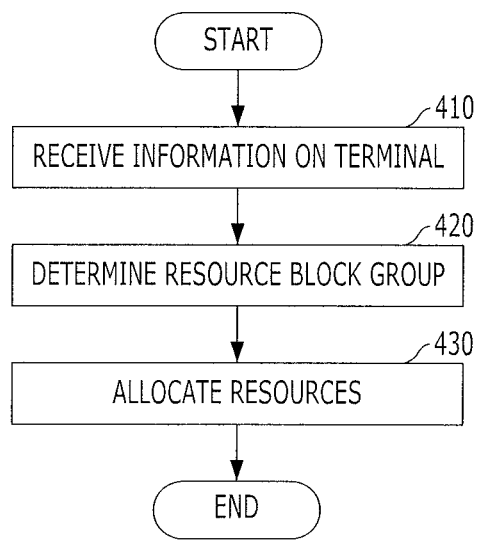
FIG. 4 is a schematic diagram showing an operation of the apparatus for allocating resources in communication systems in accordance with an embodiment of the present invention.

FIG. 4 is a schematic diagram showing the operation of the apparatus for allocating resources in communication systems in accordance with an embodiment of the present invention. FIG. 4 is a schematic diagram showing the operation of the scheduler for allocating resources in the terrestrial communication system and the satellite communication system.

Referring to FIG. 4, at step 410, the scheduler 300 receives information on a terminal from the terminal when the terminal initially accesses thereto in order to receive communication service. Here, the information on the terminal includes information on the type of terminal, information on the transmission power of the terminal that is necessary to transmit and receive data packets, and information on the antenna gain of the terminal that is necessary to transmit and receive data packets.

At step 420, the scheduler checks a bandwidth available for transmitting and receiving data packets to and from the terminal based on information on a bandwidth and determines the size of a resource block group to be allocated to the terminal at once in the available bandwidth by taking the information on the terminal and the information on the satellite (or information on the base station). Here, the scheduler 300 classifies the terminals into classes based on the information on the terminal, determines the maximum size of a resource block group so that a specific number of resource blocks or less are allocated to the terminal according to a classified class, compares the size of the resource block group determined according to the available bandwidth with the maximum size of the resource block group, and determines the size of a resource block group to be allocated to the terminal. Here, the classification of the terminal according to the class and the determination of the size of the resource block group have been described in detail with reference to FIG. 2, and thus a detailed description thereof is omitted.

At step 430, the scheduler allocates resource blocks corresponding to the determined size of the resource block group to the terminal. A terrestrial communication system and a satellite communication system provide communication service to the terminal by transmitting and receiving data packets to and from the terminal through the allocated resources.

In accordance with the present invention, limited resources are allocated to the terminal capable of transmitting and receiving data packets adaptively to satellite communication and terrestrial communication through the satellite communication and the terrestrial communication in a communication system. Accordingly, a large amount of data packets can be transmitted and received to and from the terminal through satellite communication and terrestrial communication. As a result, in communication systems, that is, both a satellite communication system and a terrestrial communication system, communication service of a variety of QoSs can be stably provided to the terminal.

While the present invention has been described with respect to the specific embodiments, it will be apparent to those skilled in the art that various changes and modifications may be made without departing from the spirit and scope of the invention as defined in the following claims.

What is claimed is:

1. An apparatus for allocating resources in a communication system, comprising:
   a reception unit configured to receive terminal information from a terminal, when the terminal initially accesses the communication system in order to receive communication service through satellite communication and terrestrial communication;
   a determination unit configured to check bandwidth information for providing the communication service to the terminal, the terminal information, satellite information for performing the satellite communication with the terminal, and base station information for performing the terrestrial communication with the terminal, and configured to determine a size of a resource block group to be allocated to the terminal, based on the bandwidth information, the terminal information, the satellite information, and the base station information; and
   an allocation unit configured to allocate resource blocks corresponding to the size of the resource block group to the terminal in order to transmit and receive data packets of the communication service to and from the terminal,
   wherein the terminal information includes type information of the terminal, transmission power information of the terminal, and antenna gain information of the terminal,
   wherein the type information includes using method information of the terminal, communication method information of the terminal, and type information of the communication service,
   wherein the determination unit checks an available bandwidth for transmitting and receiving the data packets to and from the terminal, based on the bandwidth information,
   wherein if a number of the resource blocks of the available bandwidth is 10 or less, the determination unit determines one resource block as the size of the resource block group,
   if a number of the resource blocks of the available bandwidth is more than 10 but 26 or less, the determination unit determines two resource blocks as the size of the resource block group,
   if the number of the resource blocks of the available bandwidth is more than 26 but 63 or less, determination unit determines three resource blocks as the size of the resource block group, and
   if the number of the resource blocks of the available bandwidth is more than 63, the determination unit determines four resource blocks as the size of the resource block group.

2. The apparatus of claim 1, wherein the determination unit classifies the terminal into classes in the available bandwidth, based on the terminal information, the satellite information, and the base station information.

3. The apparatus of claim 2, wherein the determination unit determines a maximum size of the resource block group for each of the classes, and determines the size of the resource block group to be allocated to the terminal in the maximum size of the resource block group, based on the terminal information, the satellite information, and the base station information.

4. The apparatus of claim 1, wherein the base station information includes transmission power information and antenna gain information of a base station performing the terrestrial communication with the terminal.

5. The apparatus of claim 1, wherein the satellite information includes transmission power information and antenna gain information of a satellite performing the satellite communication with the terminal.

6. A method of allocating resources in a communication system, comprising:
receiving terminal information from a terminal, when the terminal initially accesses the communication system in order to receive communication service through satellite communication and terrestrial communication;
checking bandwidth information for providing the communication service to the terminal, the terminal information, satellite information for performing the satellite communication with the terminal, and base station information for performing the terrestrial communication with the terminal;
determining a size of a resource block group allocated to the terminal, based on the bandwidth information, the terminal information, the satellite information, and the base station information; and
allocating resource blocks corresponding to the size of the resource block group to the terminal in order to transmit and receive data packets of the communication service to and from the terminal,
wherein the terminal information includes type information of the terminal, transmission power information of the terminal, and antenna gain information of the terminal,
wherein the type information includes using method information of the terminal, communication method information of the terminal, and type information of the communication service,
wherein the checking the bandwidth information comprises checking an available bandwidth for transmitting and receiving the data packets to and from the terminal based on the bandwidth information,
wherein if a number of the resource blocks of the available bandwidth is 10 or less, one resource block group exists,
if the number of the resource blocks of the available bandwidth is more than 10 but 26 or less, two resource block groups exist,
if the number of the resource blocks of the available bandwidth is more than 26 but 63 or less, the resource block group exist, and
if the number of the resource blocks of the available bandwidth is more than 63, four resource block groups exist.

7. The method of claim 6, wherein the determining the size of the resource block group allocated to the terminal comprises classifying the terminal into classes in the available bandwidth, based on the terminal information, the satellite information, and the base station information.

8. The method of claim 7, wherein the determining the size of the resource block group allocated to the terminal comprises:
determining a maximum size of the resource block group for each of the classes, based on the terminal information, the satellite information, and the base station information; and
determining the size of the resource block group to be allocated to the terminal in the maximum size of the resource block group, based on the terminal information, the satellite information, and the base station information.

9. The method of claim 6, wherein the base station information includes transmission power information and antenna gain information of a base station performing the terrestrial communication with the terminal.

10. The method of claim 6, wherein the satellite information includes transmission power information and antenna gain information of a satellite performing the satellite communication with the terminal.

* * * * *